United States Patent
Keyser-Allen et al.

(10) Patent No.: US 12,389,494 B2
(45) Date of Patent: *Aug. 12, 2025

(54) SIMULATION OF DEVICE REMOVAL

(71) Applicant: Sonos, Inc., Santa Barbara, CA (US)

(72) Inventors: Lee Keyser-Allen, Medford, MA (US); Arthur L. Coburn, IV, Lexington, MA (US); Hrishikesh Gossain, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,032

(22) Filed: Aug. 21, 2023

(65) Prior Publication Data
US 2024/0049349 A1 Feb. 8, 2024

Related U.S. Application Data

(63) Continuation of application No. 17/342,390, filed on Jun. 8, 2021, now Pat. No. 11,737,164.

(Continued)

(51) Int. Cl.
*H04W 76/34* (2018.01)
*H04W 24/08* (2009.01)
(Continued)

(52) U.S. Cl.
CPC ........... *H04W 76/34* (2018.02); *H04W 24/08* (2013.01); *H04W 24/10* (2013.01); *H04W 36/0027* (2013.01); *H04W 76/19* (2018.02)

(58) Field of Classification Search
CPC . H04W 24/08; H04W 24/10; H04W 36/0027; H04W 76/19; H04W 76/34
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.
(Continued)

*Primary Examiner* — Jean A Gelin

(57) ABSTRACT

In one aspect, a computing device is configured to, while operating as a control device of a networked media playback system that includes a first set of network devices and a second set of network devices, (i) transmit a first message to each network device in the first set of network devices, wherein the first message comprises a command to, at a first time, temporarily disconnect from the computing device via a particular communication protocol, (ii) transmit a second message to each network device in the second set of network devices, wherein the second message comprises a command for the network device in the second set of network devices to, at a second time, test connectivity with the computing device; and (iii) after the second time, determine whether each network device in the second set of network devices was connected to the computing device.

20 Claims, 9 Drawing Sheets

Related U.S. Application Data

(60) Provisional application No. 63/036,032, filed on Jun. 8, 2020.

(51) Int. Cl.
  *H04W 24/10* (2009.01)
  *H04W 36/00* (2009.01)
  *H04W 76/19* (2018.01)

(58) Field of Classification Search
  USPC .......................................................... 370/331
  See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,237,384 | B2 | 1/2016 | Beckhardt et al. |
| 9,661,083 | B1 * | 5/2017 | Eykholt ............... H04L 67/147 |
| 9,813,527 | B2 * | 11/2017 | Brzozowski ........... H04L 69/18 |
| 10,362,339 | B2 * | 7/2019 | Coburn, IV ........... H04L 65/61 |
| 10,885,091 | B1 | 1/2021 | Meng et al. |
| 10,986,376 | B2 * | 4/2021 | Coburn, IV ....... H04N 21/4363 |
| 11,089,076 | B1 * | 8/2021 | Thario .................. H04L 65/612 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2007/0291761 | A1 * | 12/2007 | Kauniskangas ......... H04L 67/54 370/395.2 |
| 2008/0133974 | A1 * | 6/2008 | Kogan ............... G06F 11/3688 714/E11.212 |
| 2014/0230015 | A1 * | 8/2014 | Pollock ............ H04N 21/43615 726/3 |
| 2015/0036573 | A1 * | 2/2015 | Malik .................... G08C 17/02 370/311 |
| 2015/0326634 | A1 * | 11/2015 | Millington .......... H04L 12/2803 715/716 |
| 2015/0382436 | A1 * | 12/2015 | Kelly ..................... H05B 47/19 315/131 |
| 2016/0165650 | A1 * | 6/2016 | Kim ...................... H04W 12/06 370/329 |
| 2016/0182513 | A1 * | 6/2016 | Pollock .................. H04L 63/10 726/3 |
| 2017/0063956 | A1 * | 3/2017 | Rajapakse ............. H04L 65/612 |
| 2017/0364675 | A1 * | 12/2017 | Vilke .................... H04L 9/3226 |
| 2019/0090176 | A1 | 3/2019 | Peters et al. |
| 2019/0289648 | A1 * | 9/2019 | Kim ....................... H04W 48/08 |
| 2020/0387613 | A1 * | 12/2020 | Zimny ................ H04L 41/0806 |
| 2021/0184921 | A1 * | 6/2021 | Ramanadham ..... H04L 41/0816 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Oct. 28, 2022, issued in connection with U.S. Appl. No. 17/342,390, filed Jun. 8, 2021, 17 pages.
Notice of Allowance mailed on Mar. 21, 2023, issued in connection with U.S. Appl. No. 17/342,390, filed Jun. 8, 2021, 9 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

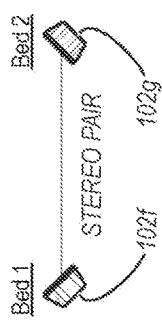
*Fig. 3B*
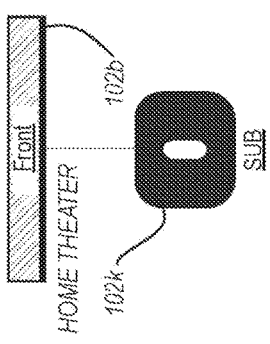
*Fig. 3C*
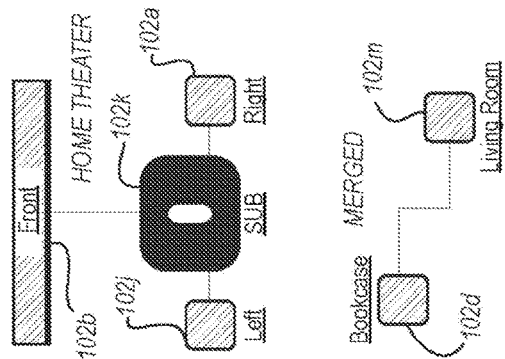
*Fig. 3D*
*Fig. 3E*
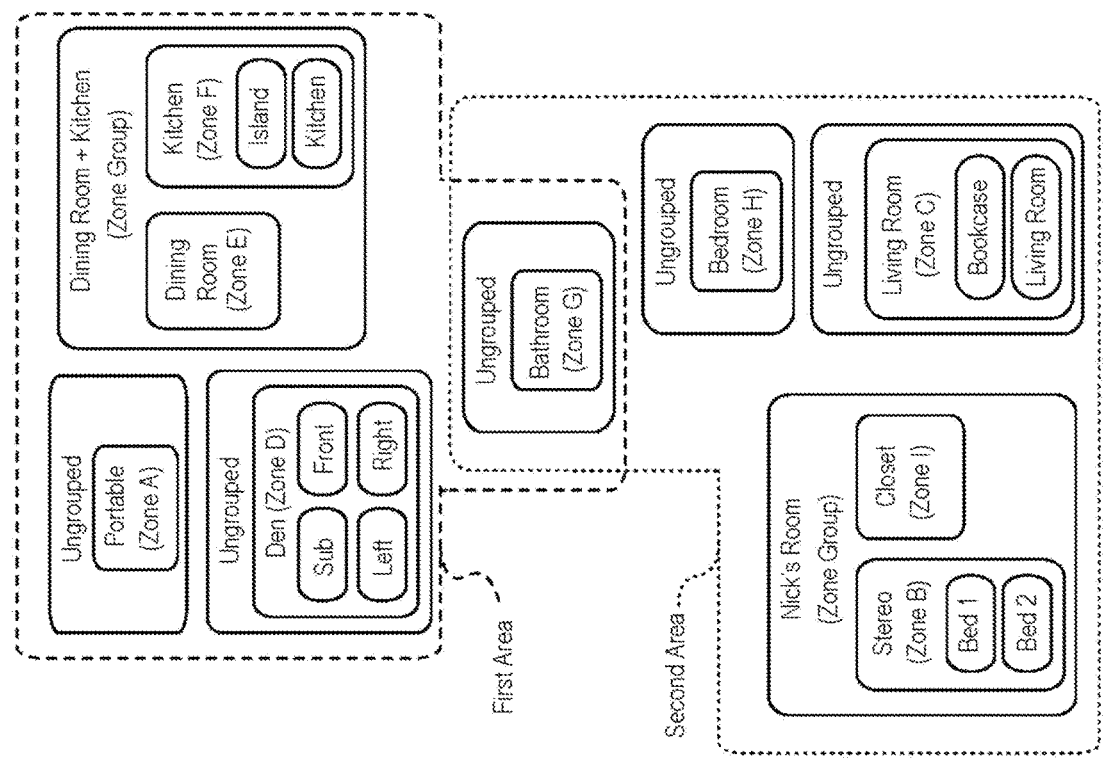
*Fig. 3A*

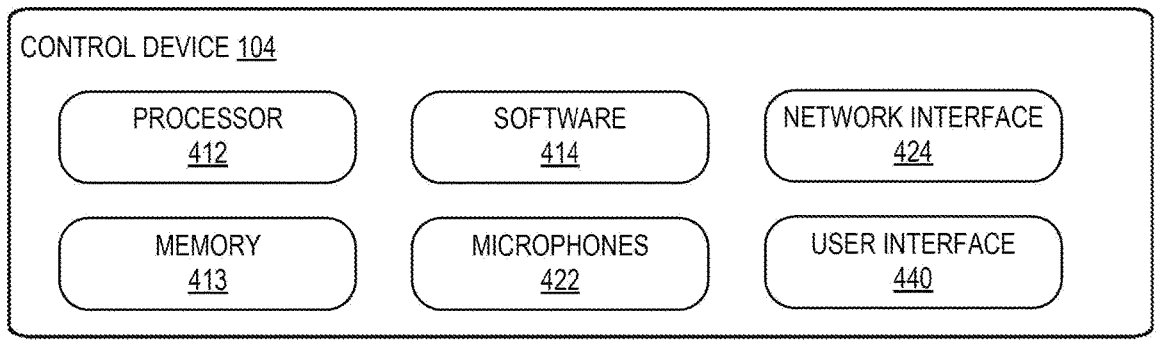
Fig. 4A
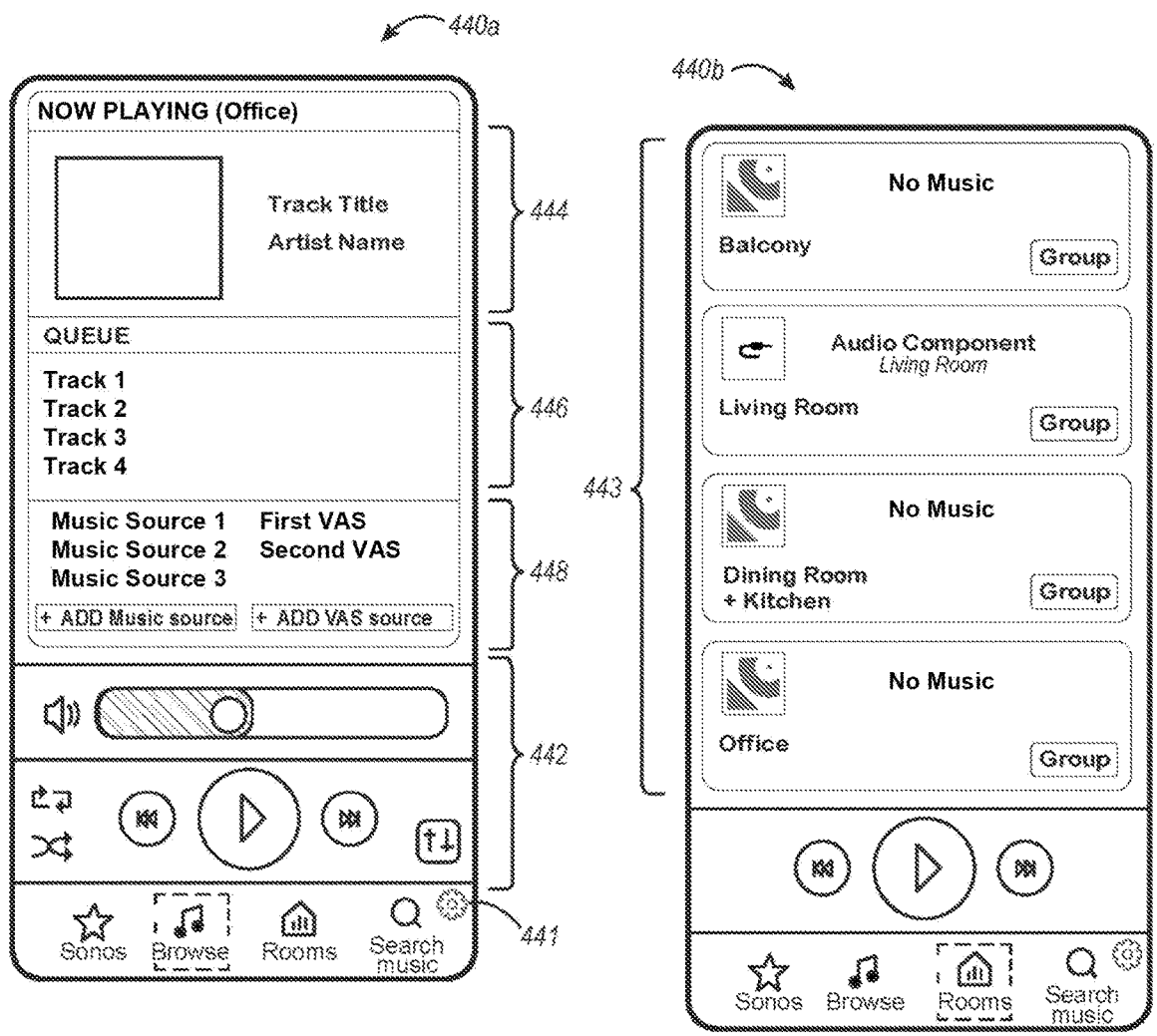
Fig. 4B
Fig. 4C

SIMULATION OF DEVICE REMOVAL

CROSS-REFERENCE TO RELATED APPLICATIONS

This application claims the benefit of priority under 35 U.S.C. § 120 as a continuation of U.S. Nonprovisional application Ser. No. 17/342,390, filed on Jun. 8, 2021, and titled "Simulation of Device Removal," which claims the benefit of priority under 35 U.S.C. § 119 to U.S. Provisional Patent App. No. 63/036,032, filed on Jun. 8, 2020, and titled "Simulation of Device Removal," the contents of each of which are incorporated herein by reference in their entirety.

FIELD OF THE DISCLOSURE

The present technology relates to consumer goods and, more particularly, to methods, systems, products, features, services, and other elements directed to media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings.

FIGS. 3A-3E are diagrams showing example playback device configurations in accordance with aspects of the disclosure.

FIG. 4A is a functional block diagram of an example controller device in accordance with aspects of the disclosure.

FIGS. 4B and 4C are controller interfaces in accordance with aspects of the disclosure.

Figure 1A:
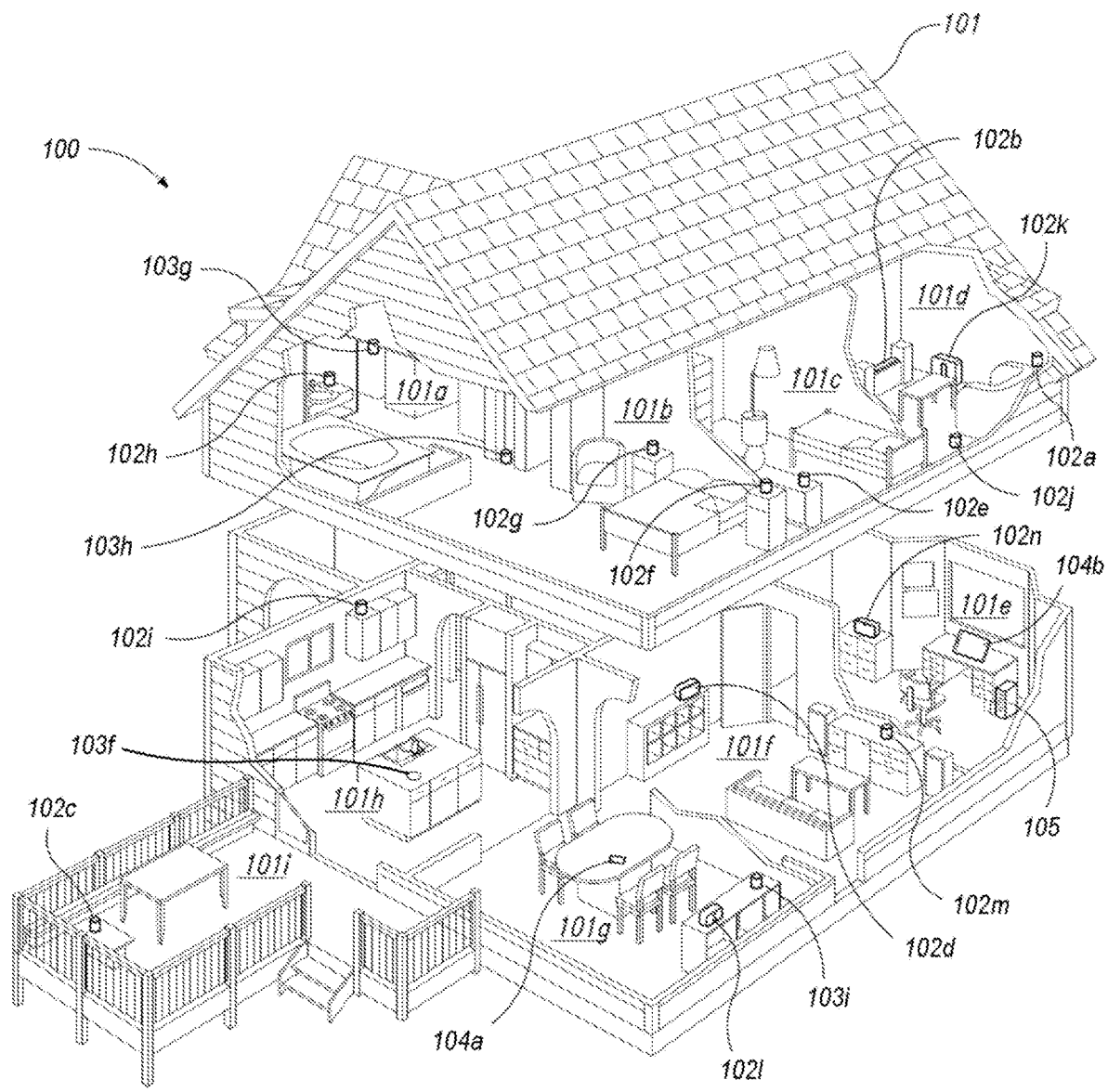
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Media playback systems may contain one or more playback devices (e.g., zone players) that are in communication with one another and may be configured to play back media or audio content in synchrony with one another. In these media playback systems, playback devices may be added over time, and the newer devices may have newer hardware that enables new functionality that might not be fully supportable by older playback devices having older hardware. For instance, older playback devices may have a particular set of network communication capabilities such that a particular network protocol (e.g., via a hub or bridge device, via a direct ethernet connection, etc.) may be used for the older playback device to effectively communicate with the other playback devices, controller devices, and/or audio content sources. For instance, the older playback devices may use a Spanning Tree Protocol (STP) via a root networking device in order to communicate with the other playback devices, controller devices, and/or audio content sources. On the other hand, a newer playback device may have a newer set of network communication capabilities such that a different network protocol (e.g., non-hierarchical mesh network) may be used for the newer playback device to effectively communicate with other playback devices, controller devices, and/or audio content sources.

As a user adds newer playback devices to a media playback system of one or more pre-existing playback devices that uses one or more additional network devices (e.g., a root or bridge networking devices), the additional network devices may be rendered obsolete as the newer playback devices may provide the same functionality as the additional network devices. For instance, if the additional network devices include a bridge device and the user adds a newer playback device that can perform the same bridging function, then the bridge device is no longer necessary. Additionally, the additional network devices may be rendered obsolete because newer playback devices may not need the additional network devices in order to connect to the one or more pre-existing playback devices of the media playback system. For instance, using the previous example, if the bridge device serves to connect the playback devices to the one or more pre-existing playback devices of the media playback system and the user adds a newer playback device that connects directly to the media playback system, the bridge device is no longer necessary for the media playback system to operate. Further, the additional network devices may be rendered obsolete because the newer playback devices may not need the additional network devices in order to connect to a router or access point in order to retrieve for playback, audio content from a streaming music service. Continuing with the previous example, if the bridge device serves as a gateway for the media playback device to access streaming audio content via the broader Internet, and the newer playback device can access a router or access point directly without the bridge device, the bridge device may be no longer necessary.

However, users may be unaware that the additional network devices are no longer necessary for the operation of their media playback system when they add the newer playback devices. One challenge presented with the removal of unnecessary hardware from a media playback system is that the user may not be able to easily determine whether removing one or more devices from the media playback system will disrupt the media playback system, rendering it unsuitable for the user's purposes. For example, a media playback system may include a bridge device that is configured to facilitate connection between the playback devices via the creation of a wireless mesh network. Over time, the user may add additional playback devices that connect to the media playback system through the wireless mesh network. However, the user may not fully appreciate the function the bridge device is performing and at a later time, may remove the bridge device, which in turn may render the media playback system inoperable. In this example, it may not be apparent to the user which devices (e.g., the bridge device) of the media playback system are necessary for continued operation.

One potential solution to this challenge is for the user to manually disconnect every device that is connected to the media playback system and then systematically reconnect each disconnected device while testing connectivity to the media playback system. However, this process can be tedious and might not reliably identify the devices that can be removed from the system.

To address this problem, a user device that is connected to the media playback system may simulate the removal of any additional network devices and/or older playback devices by temporarily disconnecting them from the remaining playback devices in the media playback system and subsequently testing the connection of the remaining playback devices to one another and the user device. In this respect, the user device is able to, through the simulation, determine whether and which of the tested devices can be removed from the system without disrupting the connection of the other devices in the system. The user device may also present an identification of the devices that can be removed to the user for manual removal and/or disconnection.

Example devices, systems, and methods configured in accordance with embodiments of this disclosure help address these and other challenges associated with simulating the removal of devices of a media playback system to identify devices that can be potentially removed from the media playback system without affecting the performance of the media playback system. In a first example embodiment, a computing device may include at least one processor, a network interface, and at least one non-transitory computer-readable medium with program instructions stored on the at least one non-transitory computer-readable medium that are executable by the at least one processor such that the computing device is configured to, while operating as a control device of a networked media playback system that includes a first set of network devices and a second set of network devices, (i) transmit, via the network interface, a first message to each network device in the first set of network devices, wherein the first message comprises a command for the network device in the first set of network devices to, at a first time, temporarily disconnect from the computing device via a particular communication protocol, (ii) transmit, via the network interface, a second message to each network device in the second set of network devices, wherein the second message comprises a command for the network device in the second set of network devices to, at a second time, test connectivity with the computing device, and (iii) after the second time, determine whether each network device in the second set of network devices is connected to the computing device.

In some examples, a second example embodiment may include a non-transitory computer-readable medium with program instructions stored on the non-transitory computer-readable medium that are executable by the at least one processor such that the computing device is configured to perform the functions of the first example embodiment.

In some examples, a third example embodiment may include a method of performing the functions of the first example embodiment.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
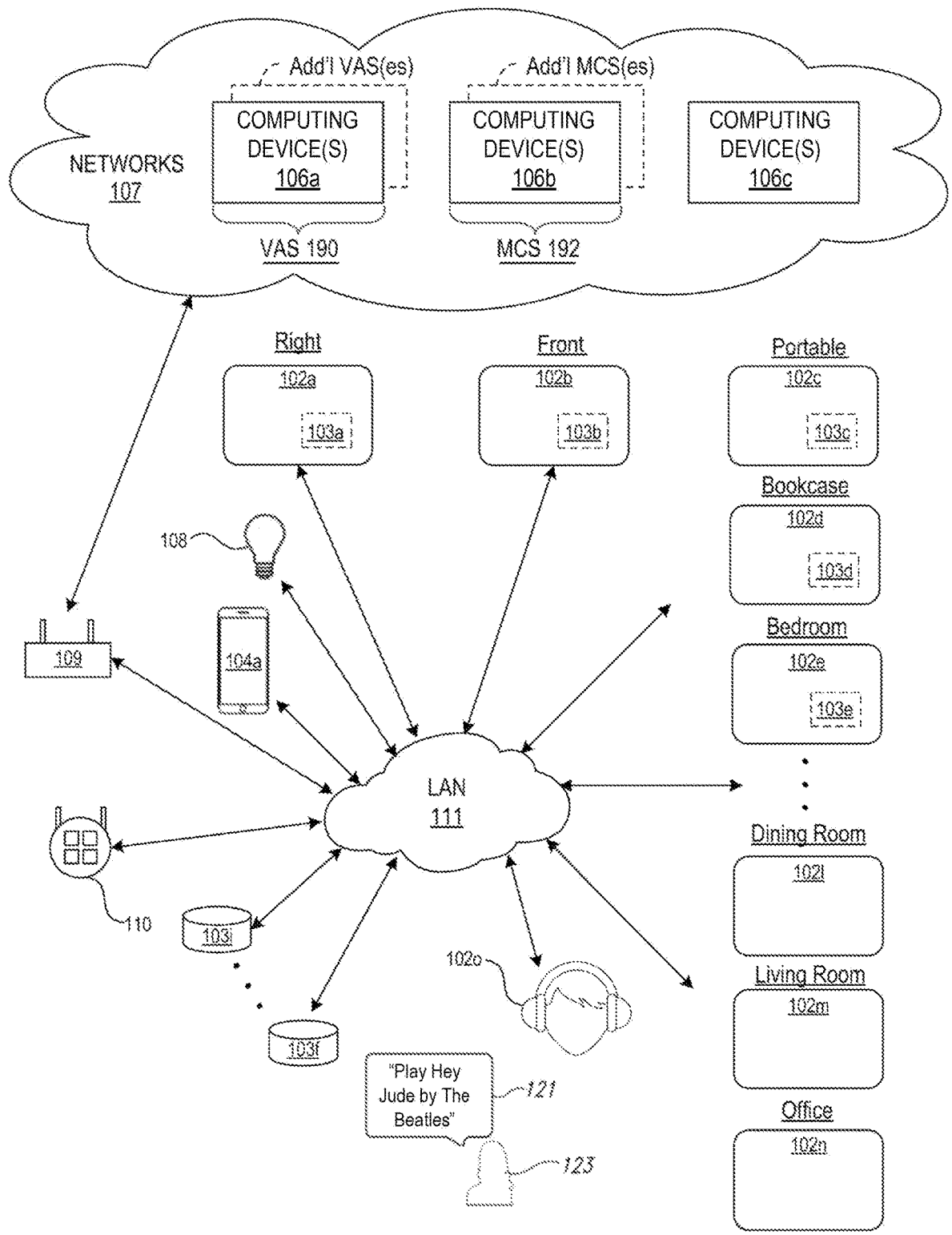
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 104 and/or other network devices of the MPS 100 may be coupled to one another via point-to-point connections and/or over other connections, which may be wired and/or wireless, via a local network 111 that may include a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the local network 111. The local network 111 may be, for example, a network that interconnects one or more devices within a limited area (e.g., a residence, an office building, a car, an individual's workspace, etc.). The local network 111 may include, for example, one or more local area network (LANs) such as wireless local area networks (WLANs) (e.g., WI-FI networks, Z-WAVE networks, etc.) and/or one or more personal area networks (PANs) such as BLUETOOTH networks, wireless USB networks, ZIGBEE networks, and IRDA networks.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 104 may be communicatively coupled to at least one remote computing device associated with a voice assistant service ("VAS") and at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, NUANCE, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over the local network 111 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 104. For example, the technologies herein may be utilized within an environment having a single playback device 102 and/or a single NMD 103. In some examples of such cases, the local network 111 (FIG. 1B) may be eliminated and the single playback device 102 and/or the single NMD 103 may communicate directly with the remote computing devices 106a—d. In some embodiments, a telecommunication network (e.g., an LTE network, a 5G network, etc.) may communicate with the various playback, network microphone, and/or controller devices 104 independent of the local network 111.

While specific implementations of MPS's have been described above with respect to FIGS. 1A and 1B, there are numerous configurations of MPS's, including, but not limited to, those that do not interact with remote services, systems that do not include controllers, and/or any other configuration as appropriate to the requirements of a given application.

a. Example Playback & Network Microphone Devices

Figure 2A:
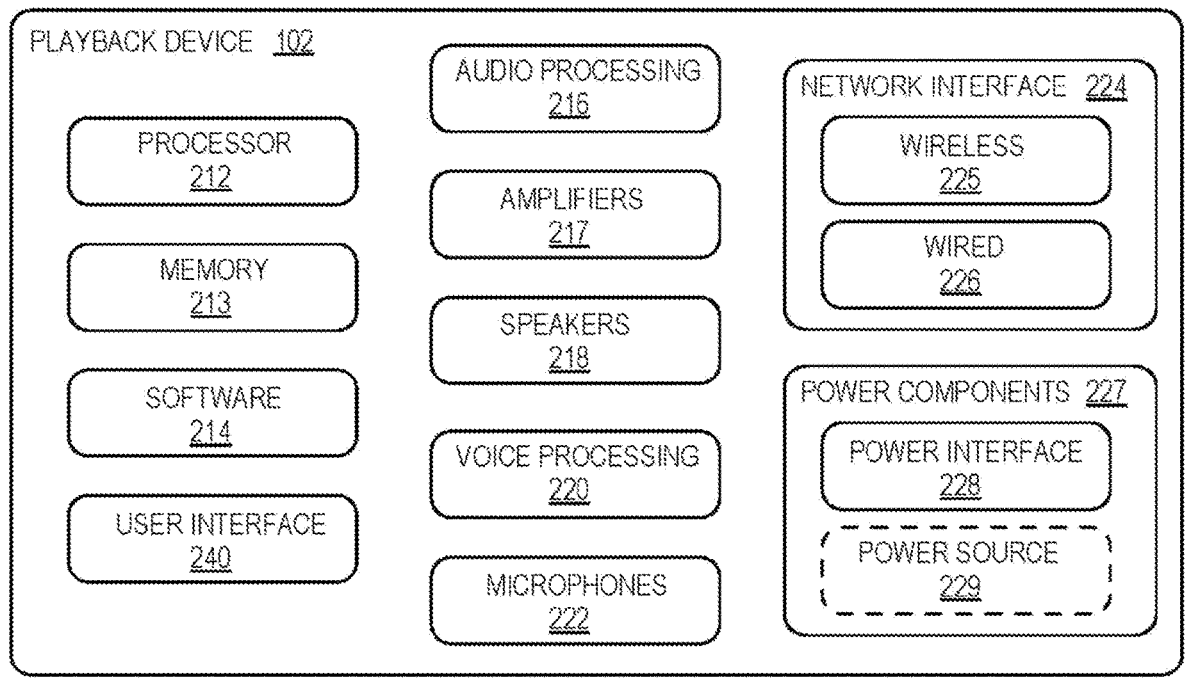
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions. The processor 212 may comprise any of a variety of processors including, for example, one or more general-purpose processors (GPPs) and/or one or more special-purpose processors (SPPs) (e.g., digital signal processors (DSPs), neural processors, etc.).

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), one or more buffers, and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.11ad, 802.11af, 802.11ah, 802.11ai, 802.11aj, 802.11aq, 802.11ax, 802.11 ay, 802.15, BLUETOOTH, 4G mobile communication standard, 5G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A includes both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. Patent Publication No. 2017-0242653.

As further shown in FIG. 2A, the playback device 102 also includes power components 227. The power components 227 may include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." Those portable playback devices that weigh no more than fifty ounces (e.g., between three ounces and fifty ounces, between five ounces and fifty ounces, between ten ounces and fifty ounces, between ten ounces and twenty-five ounces, etc.) may be referred to herein as an "ultra-portable playback device." Those playback devices that operate using an external power source instead of an internal power source may be referred to herein as a "stationary playback device," although such a device may in fact be moved around a home or other environment.

The playback device 102 may further include a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
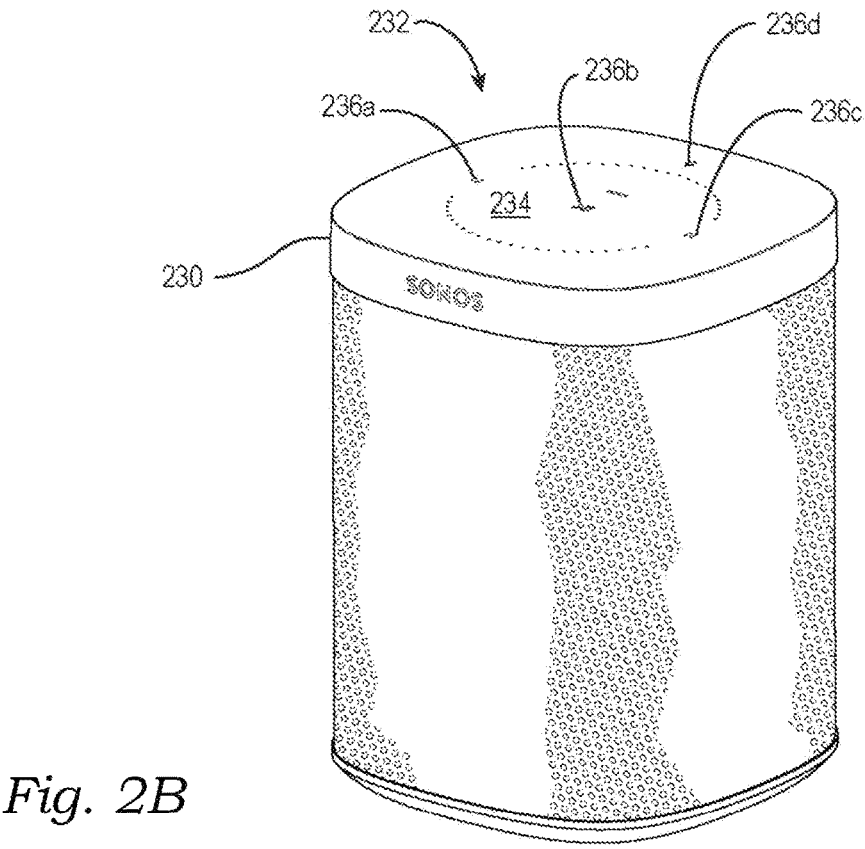
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

As mentioned above, the playback device 102 may be constructed as a portable playback device, such as an ultra-portable playback device, that comprises an internal power source. In one embodiment, such a portable playback device may comprise a housing that includes a user interface in the form of a control area at a top portion of the housing. The control area may include a capacitive touch sensor for controlling audio playback, volume level, and other functions. The housing of the portable playback device may be configured to engage with a dock that is connected to an external power source via a cable. The dock may be configured to provide power to the portable playback device to recharge an internal battery. In some embodiments, the dock may comprise a set of one or more conductive contacts positioned on the top of the dock that engage with conductive contacts on the bottom of the housing. In other embodiments, the dock may provide power from the cable to the portable playback device without the use of conductive contacts. For example, the dock may wirelessly charge the portable playback device via one or more inductive coils integrated into each of the dock and the portable playback device.

In some embodiments, the playback device 102 may take the form of a wired and/or wireless headphone (e.g., an over-ear headphone, an on-ear headphone, or an in-ear headphone). For instance, in one such implementation, the playback device 102 may comprise a housing that includes a headband that couples a first earpiece to a second earpiece. Each of the earpieces may house any portion of the electronic components in the playback device, such as one or more speakers. Further, one or both of the earpieces may include a control area for controlling audio playback, volume level, and other functions. The control area may comprise any combination of the following: a capacitive touch sensor, a button, a switch, and a dial. The housing may further include first and second ear cushions that are coupled to the first and second earpieces, respectively. The ear cushions may provide a soft barrier between the head of a user and the earpieces to improve user comfort and/or provide acoustic isolation from the ambient (e.g., passive noise reduction (PNR)). In some implementations, the wired and/or wireless headphones may be ultra-portable playback devices that are powered by an internal energy source and weigh less than fifty ounces.

It should be appreciated that the playback device 102 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback device 102 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

While specific implementations of playback and network microphone devices have been described above, including implementations described with respect to FIGS. 2A and 2B, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of playback device 102 is described with reference to MPS 100, one skilled in the art will recognize that playback devices as described herein can be used in a variety of different environments, including (but not limited to) environments with more and/or fewer elements, without departing from this invention. Likewise, MPS's as described herein can be used with various different playback devices.

By way of illustration, SONOS, Inc. presently offers (or has offered) for sale certain playback devices that may implement certain of the embodiments disclosed herein, including a "SONOS ONE," "PLAY:1," "PLAY:3," "PLAY: 5," "PLAYBAR," "AMP," "CONNECT:AMP," "PLAYBASE," "BEAM," "CONNECT," "SUB," and "SONOS MOVE." Any other past, present, and/or future playback devices may additionally or alternatively be used to implement the playback devices of example embodiments disclosed herein. Additionally, it should be understood that a playback device is not limited to the examples illustrated in FIG. 2A or 2B, or to the SONOS product offerings. For example, a playback device may be integral to another device or component such as a television, a lighting fixture, or some other device for indoor or outdoor use.

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. Patent Publication No. 2017-0242653. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. Patent Publication No. 2018-0107446 published Apr. 19, 2018 and titled "Room Association Based on Name," and U.S. Pat. No. 8,483,853 filed Sep. 11, 2007, and titled "Controlling and manipulating groupings in a multi-zone media system," each of which is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Controller devices in accordance with several embodiments of the invention can be used in various systems, such as (but not limited to) an MPS as described in FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 may be configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 may also include a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b include a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

III. Example Simulation of Network Device Removal

As previously discussed, a media playback system may include one or more network devices (e.g., playback devices, networking components, smart devices, etc.) that may no longer be necessary for the operation of the media playback system due to the addition of newer network devices to the media playback system, or potentially a software and/or firmware update to the media playback system that renders one or more of the network devices unusable. However, the user may not know which network devices can be removed from the media playback system while still allowing the media playback system to operate as desired. As one solution, a user may attempt to disconnect one or more of the network devices and then assess whether the media playback system is still operational. However, this approach may be tedious and might not exactly identify which of the network devices can be removed from the media playback system without crippling its operation. This may be due in part to different network topologies that may be used to connect each network device to a particular media playback system.

For instance, as one example, a media playback system may have a network topology in which one or more of the network devices (e.g., bridging device or hub) facilitates connection of the network devices in the media playback system. In this example, the media playback system may be configured to have a particular network device connected via ethernet to a wireless router and/or access point and then, in turn, the particular network device may be configured to serve as an intermediate connection point by creating a wireless mesh network to which other network devices in the media playback system can connect. In this respect, if a user disconnects the particular network device from the media playback system, the other network devices may cease to function as desired. However, short of manually disconnecting each network device and determining whether the media playback system remains functional for the remaining connected devices, the user may not be able to confidently remove devices from the media playback system.

To provide the user with more confidence when removing devices from the media playback system, a user device may simulate the removal of one or more network devices from the media playback system and then provide the user with an indication of whether the remaining network devices remain connected to the media playback system, thereby determining whether one or more network devices can be removed while still allowing the media playback system to operate normally.

Figure 5:
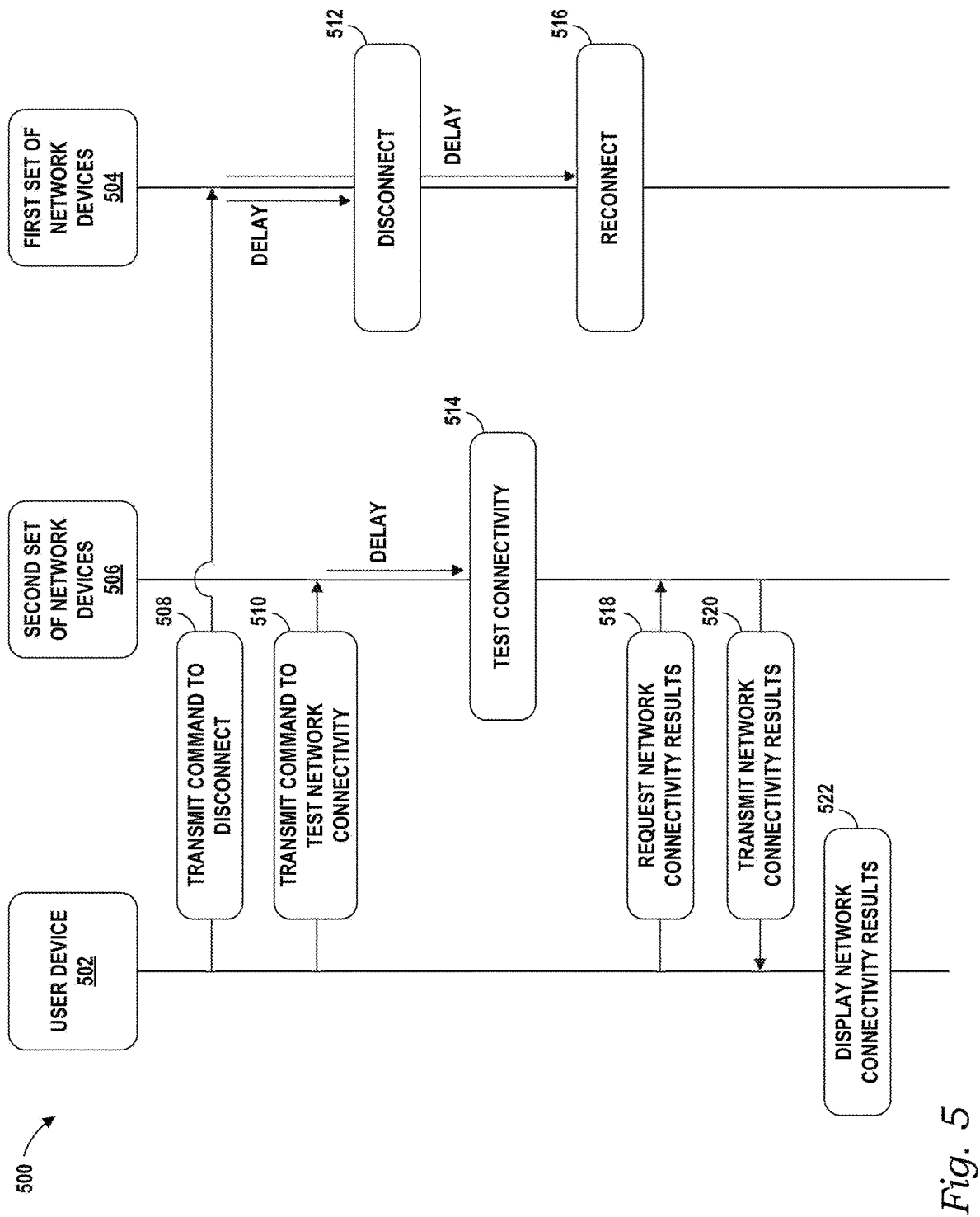
FIG. 5 is a message flow diagram between an example user device, an example first set of network devices, and an example second set of network devices, in accordance with aspects of the disclosure.

FIG. 5 depicts a message flow diagram 500 between a user device 502, a first set of network devices 504, and a second set of network devices 506 for simulating the removal of the first set of network devices 504. The user device 502 may include one or more of controller devices 104a-b as described with respect to FIG. 1A, and/or controller device 104 as described with respect to FIGS. 4A-4C above. The first set of network devices 504 may be one or more network devices that will be evaluated for disconnection from a media playback system, which may include any of the playback devices 102a-102o described above with respect to FIGS. 1A-3B above. The first set of network devices 504 may also include one or more non-playback network devices as well, including but not limited to a bridging device, such as the "SONOS BRIDGE," and/or a Wi-Fi extender device, such as the "SONOS BOOST."

The second set of network devices 506 shown in FIG. 5 may be one or more network devices that a user desires to keep connected to the media playback system, which may also include any of the playback devices 102a-102o described above with respect to FIGS. 1A-3B above. The user device 502, the first set of network devices 504, and the second set of network devices 506 may be communicatively coupled based on a network topology of the media playback system. The network topology may take various forms, some examples of which are described further below with respect to FIGS. 6A-6D.

Further, it should be understood that while this disclosure discusses examples with respect to network devices within media playback systems, this is for purposes of illustration only and the functions described herein may also be applied to any networked system of devices (e.g., "smart" home networks that include Internet of Things (IoT) devices such as smart thermostats, smart light bulbs, smart outlets, smart appliances, smart fixtures, etc.).

The user device 502, the first set of network devices 504, and the second set of network devices 506 for simulating the removal of the first set of network devices 504 may be connected to one another as part of a network topology of the media playback system. However, depending on the configuration of the network topology, the user device 502 may perform pre-simulation steps before the user device 502 begins performing the functions in the message flow diagram 500. For instance, as one example, if the first set of network devices 504 includes a bridge device that creates a mesh network to which the second set of network devices 506 connect, the second set of network devices 506 may require network credentials in order to perform the simulation described with respect to the message flow diagram 500.

To provide these network credentials, the user device 502 may first request network credentials from a user. The network credentials may include Wi-Fi credentials that permit connection to an accessible LAN (e.g., Wi-Fi network). The network credentials may take various forms. As one possibility, the network credentials may include (i) a service set identifier (SSID) and (ii) a password. In this respect, the SSID may include the name of a Wi-Fi network and the password may include a string of characters that complies with one of the wired equivalent privacy (WEP), Wi-Fi protected access (WPA), or Wi-Fi protected access version 2 (WPA2) security methods. The network credentials may take other forms as well.

The user device 502 may then test the network credentials, which may take various forms. As one possibility, testing the network credentials may involve the user device 502 transmitting the network credentials to one or more network devices of the first set of network devices 504 along with a command configured to cause the one or more network devices of the first set of network devices 504 to attempt to establish a connection to the Wi-Fi network.

However, in some circumstances, the first set of network devices may not have the capability to connect to the Wi-Fi network because of hardware or software limitations. Thus, as another possibility, testing the network credentials may involve the user device 502 transmitting the network credentials to one or more network devices of the second set of network devices 506 along with a command configured to cause the one or more network devices of the second set of network devices 506 to attempt to establish a connection to the Wi-Fi network. In this respect, if the one or more network devices of the second set of network devices 506 is able to establish a connection to the Wi-Fi network, the user device 502 can infer that the network credentials are valid.

As yet another possibility, testing the network credentials may involve the user device 502 establishing a connection with the Wi-Fi network itself. In this respect, the user device 502 can validate the network credentials without the need of transmitting the credentials to the first set of network devices 504 or the second set of network devices 506 for testing.

The function of testing the network credentials may take other forms as well.

The user device 502 may then transmit the network credentials to both the first set of network devices 504 and the second set of network devices 506. The function of transmitting the network credentials serves to provide the first set of network devices 504 and the second set of network devices 506 with the ability to connect to the media playback system directly through the Wi-Fi network, which may be necessary depending on the topology of the media playback system.

Once the user device 502 transmits the network credentials to each network device in the first set of network devices 504 and the second set of network devices 506, the user device 502 can begin performing the steps associated with the message flow diagram 500.

At block 508, the user device 502 may transmit, at an initialization time, a command to the first set of network devices 504 to, at a first time, temporarily disconnect from the other network devices in the media playback system via a particular communication protocol.

The command the user device 502 transmits to the first set of network devices 504 may take various forms. As one possibility, the command may include a command to disconnect from the other network devices in the media playback system via a particular communication protocol after a first delay. In this respect, the particular communication protocol may take various forms. As one example, the particular communication protocol may include a wired communication protocol. As another example, the particular communication protocol may include a wireless communication protocol. The particular communication protocol may take other forms as well.

Further, the particular communication protocol via which the first set of network devices 504 should disconnect may depend on the network topology of the media playback system. For instance, if the first set of network devices 504 are connected to the other network devices in the media playback system via a wired communication protocol, then the command to disconnect from the other network devices in the media playback system via a particular communication protocol may include a command to disconnect from the media playback system via the wired communication protocol. Likewise, if the first set of network devices 504 are connected to the other network devices in the media playback system via a wireless communication protocol, then the command to disconnect from the media playback system via a particular communication protocol may include a command to disconnect from the other network devices in the media playback system via the wireless communication protocol.

As another possibility, the command the user device 502 transmits to the first set of network devices 504 may include a command to later reconnect to the other network devices in the media playback system via the particular communication protocol. In this respect, the period of time that the first set of network devices 504 is disconnected may be long enough (e.g., one to two minutes) to allow the second set of network devices 506 to test network connectivity to the other network devices in the media playback system, which is discussed in detail below with respect to block 510. This may be beneficial in simulating the removal of the first set of network devices 504 insofar as the first set of network devices 504 will remain disconnected long enough for the second set of network devices 506 to complete their network connectivity test.

The command the user device 502 transmits to the first set of network devices 504 may take other forms as well.

As shown at block 510, the user device 502 may transmit a command to each network device of the second set of network devices 506 to, at a second time, test their network connectivity with other network devices in the media playback system. The function of testing their network connectivity may take various forms. As one possibility, testing network connectivity may involve each network device of the second set of network devices 506 querying the user device 502 via the LAN. In this respect, if each network device of the second set of network devices 506 is able to query the user device 502, then each network device of the second set of network devices 506 may determine that the network connectivity test was successful. As another possibility, testing network connectivity may involve each network device of the second set of network devices 506 establishing connection to a website (e.g., on the Internet) via the LAN. In this respect, each network device of the second set of network devices 506 may determine that the network connectivity test was successful if it is able to receive one or more data packets from the website. The function of each network device of the second set of network devices 506 testing its network connectivity may take other forms as well.

In some circumstances, one or more of the network devices in the second set of network devices 506 may determine that the network connectivity test was unsuccessful. These circumstances may depend on the network topology of the media playback system via which the second set of network devices 506 is connected. As one example, one or more of the first set of network devices 504 may have served as a gateway, access point, or bridge to the media playback system for one or more network devices in the second set of network devices 506. As another example, one network device of the first set of network devices 504 may have created a wireless mesh network to which one or more of the network devices of the second set of network devices 506 is connected. As yet another example, one or more network devices of the first set of network devices 504 may have served as one or more nodes of a wireless mesh network through which one of the network devices of the second set of network devices 506 achieved its connection to the other network devices in the media playback system. In this respect, the first set of network devices 504 carrying out the command to disconnect from the other network devices in the media playback system as discussed above with respect to block 510 may cause the network connectivity test of one or more network devices in the second set of network devices 506 to be unsuccessful.

Further, similar to the command discussed above with respect to block 514, the user device 502 may command each network device of the second set of network devices 506 to test its network connectivity with other network devices in the media playback system after a second delay. The second delay may be longer than the first delay, and long enough to allow each network device of the first set of network devices 504 to fully disconnect from the other network devices in the media playback system via the particular communication protocol. In this respect, the second delay increases the likelihood that each network device in the second set of network devices 506 tests its network connectivity during the simulated removal of the first set of network devices 504 from the media playback system.

As shown at block 512, the first set of network devices 504 may, at the first time, temporarily disconnect from the LAN. As previously discussed, the function of disconnecting from the LAN may involve temporarily disconnecting from the LAN via a particular communication protocol (e.g., a wired or wireless communication protocol) depending on the network topology of the media playback system. Further, the first set of network devices 504 temporarily disconnecting from the LAN may allow the second set of network devices 506 to properly test their network connectivity under the desired conditions.

As shown at block 514, the second set of network devices 506 may, at the second time, test their network connectivity to the other network devices in the media playback system. As previously discussed with respect to block 510, the function of testing their network connectivity may include, after the second delay, (i) querying the user device 102, (ii) establishing a connection to a website (e.g., on the Internet), (iii) or an equivalent method.

As shown at block 516, the first set of network devices 504 may, at a third time, reconnect to the other network devices in the media playback system. As previously discussed with respect to block 508, the function of reconnecting to the other network devices in the media playback system may include reconnecting to the LAN via the particular communication protocol (e.g., wired or wireless communication protocol) after a third delay, which is longer than the second delay and long enough to allow the network connectivity test performed at block 514 to be completed.

As shown at block 518, the user device 502 may request network connectivity results from each network device in the second set of network device 506. The network connectivity results may take various forms. As one possibility, the network connectivity results may take the form of a success or failure indication. In this respect, the network connectivity results may simply indicate whether each network device in the second set of network devices 506 was able to establish a connection with other network devices in the media playback device and, in turn, the user device 502. As another possibility, the network connectivity results may take the form of a detailed network analysis that includes information including, but not limited to (i) network connection strength, (ii) bandwidth, and (iii) latency. The network connectivity results may take other forms as well.

As shown at block 520, each network device in the second set of network devices 506 may transmit its network connectivity test results to the user device 502. Upon receiving the network connectivity results, the user device 502 may determine whether the simulation of removing the first set of network devices 504 was successful or unsuccessful. This determination may take various forms. As one possibility, if all of the network connectivity test results indicate a successful connection with other network devices in the media playback system, then the user device 502 may determine that the simulation of removing the first set of network devices 504 was successful. As another possibility, if just one of the network connectivity test results indicates that a network device was unable to connect to other network devices in the media playback system while the first set of network devices 504 were disconnected, then the user device 502 may determine that the simulation of removing the first set of network devices 504 was unsuccessful. The determination of whether the simulation of removing the first set of network devices 504 was successful or unsuccessful may take other forms as well.

Once the user device 502 has determined whether the simulation of removing the first set of network devices 504 was successful or unsuccessful, at block 522, the user device 502 may display the network connectivity results to the user. The network connectivity results that are displayed to the user may take various forms that may depend on whether the user device 502 determined that the simulation of removing the first set of network devices 504 was successful or unsuccessful. As one possibility, if the user device 502 determined that the simulation was successful, the network connectivity results that are displayed to the user may take the form of an indication that informs the user that the user can confidently remove the first set of network devices 504 from the media playback system without affecting performance of the media playback system. As another possibility, if the user device 502 determined that the simulation was unsuccessful, the network connectivity results that are displayed to the user may take the form of an indication that informs the user that the user cannot remove the first set of network devices 504 from the media playback system without affecting performance of the media playback system. As yet another possibility, if the user device 502 determined that the simulation was unsuccessful, the network connectivity results that are displayed to the user may take the form of troubleshooting instructions that inform the user of potential adjustments that can be made to the media playback system in an attempt to improve the network connectivity results. As still yet another possibility, the user device 502 may determine that the simulation of removing a first subset of network devices in the first set of network devices 504 was unsuccessful, but that the simulation of removing a second subset of network devices of the first set of network devices 504 was successful. In this respect, the network connectivity results that are displayed to the user may take the form of an indication that informs the user that the user (i) can remove the second subset of network devices of the first set of network devices 504 without affecting performance of the media playback system, and (ii) cannot remove the first subset of network devices of the first set of network devices 504 without affecting performance of the media playback system. The network connectivity results that are displayed to the user may take other forms as well.

As mentioned above, some aspects of the method flow diagram 500 may change or be affected by a given media playback system's network topology. As such, FIGS. 6A-6D provide illustrative examples of different media playback system network topologies and how the method flow diagram 500 may be applied to each.

Figure 6A:
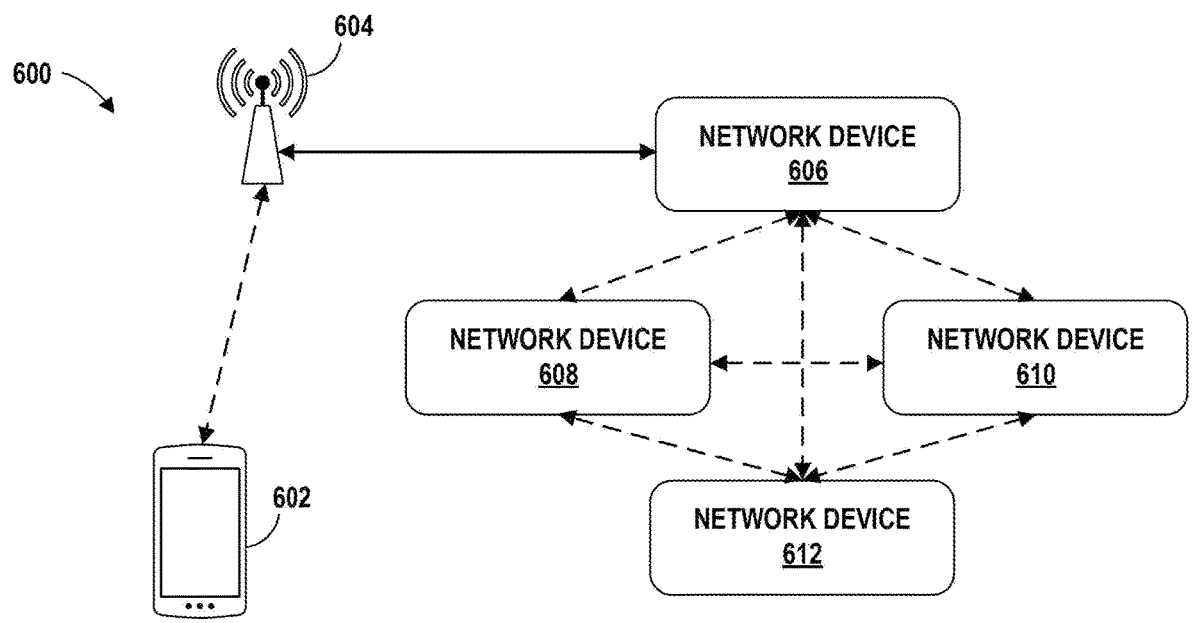
FIG. 6A is an example network topology in accordance with aspects of the disclosure.

FIG. 6A depicts a media playback system network topology 600 that includes a user device 602, a router 604, and network devices 606, 608, 610, and 612. The user device 602 may include one or more of controller devices 104 as described with respect to FIG. 1A, controller device 104 as described with respect to FIGS. 4A-4C above, as well as the user device 502 as described with respect to FIG. 5. Further, as shown in FIG. 6A, the network device 606 may be a wireless bridge that is configured to connect the network devices 608, 610, and 612 to the LAN via a wireless mesh network created by the network device 606. The network devices 608, 610, and 612 may include any of playback devices 102a-102o as described with respect to FIGS. 1A-3E, but notably, the network device 608 may lack an ability to connect to the LAN without the mesh network created by the network device 606, while network devices 610 and 612 may have the ability to connect to the LAN independently of the network device 606.

As shown, the network topology 600 includes the user device 602 wirelessly connected to the router 604 via a wireless communication protocol (denoted by a dashed line)

and the network device 606 connected to the router 604 via a wired communication protocol (denoted by a solid line).

In practice, applying the steps of the method flow diagram 500 described above with respect to FIG. 5 to the network topology 600 may first include the user device 602, after validating and transmitting the network credentials of the LAN, transmitting a command to the network device 606 to temporarily disconnect from the other network devices (e.g., the user device 602 and the network devices 608, 610, and 612) in the media playback system via the wired communication protocol. As previously discussed, this command might be sent at an initialization time and may include a command for the network device 606 to, at a first time, temporarily disable a network interface that corresponds to the wired communication protocol (e.g., temporarily switch off its ethernet port). The command might also include a command to, after a delay, reenable the network interface that corresponds to the wired communication protocol.

The user device 602 may also transmit a command to each of the network devices 608, 610, and 612 to, at a second time, test its network connectivity with other network devices in the media playback system. In this example, the second time is after the first time at which the network device 606 temporarily disconnects from the other network devices in the media playback system but before a third time at which the network device 606 reconnects to the other network devices in the media playback system.

The network device 606 may then, at the first time, temporarily disconnect from the other network devices in the media playback system via the LAN, thereby disconnecting the wireless mesh network.

Then, at the second time, each of the network devices 608, 610, and 612 may perform a network connectivity test, which may take the form of attempting to query the user device 602 via the LAN. As previously mentioned, network device 608 may be unable to query the user device 602 due to an inability to connect to the LAN while the network device 606 is temporarily disconnected. Meanwhile, network devices 610 and 612 may query the user device 602 without issue as the network devices 610 and 612 have the capability to connect to the LAN independent of the wireless mesh network created by the network device 606.

Next, at the third time, the network device 606 may reconnect to the LAN and thereby reestablish the wireless mesh network. In turn, the network device 608 may reconnect to the other network devices in the media playback system via the wireless mesh network, enabling the network device 608 to transmit network connectivity results to the user device 602.

The user device 602 may then transmit a request to the network devices 608, 610, and 612 for their respective network connectivity test results. In turn, each of the network devices 608, 610, and 612 may transmit its respective network connectivity test results to the user device 602. Upon receiving the network connectivity test results, the user device 602 may determine that the network device 608 was unable to connect to the other network devices in the media playback system via the LAN, while the network devices 610 and 612 were able to connect to the other network devices in the media playback system via the LAN.

The user device 602 may then communicate this determination to the user via a display on the user device 602, indicating that a removal of the network device 606 would disrupt at least a portion of the currently arranged media playback system. The user device 602 may additionally communicate further troubleshooting steps or additional options to the user.

Figure 6B:
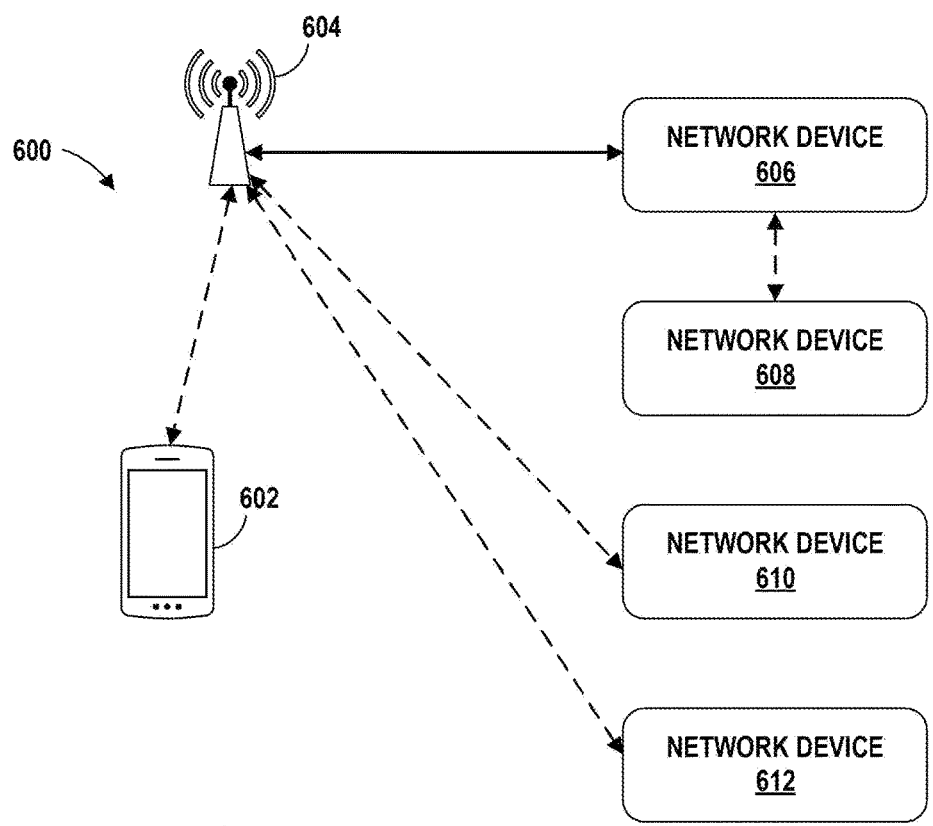
FIG. 6B is an example network topology in accordance with aspects of the disclosure.

FIG. 6B depicts an alternative media playback system network topology 600 that includes the same user device 602, router 604, and network devices 606, 608, 610, and 612. However, as shown in FIG. 6B, the network topology 600 includes the user device 602 and the network devices 610 and 612 connected to the other network devices in the media playback system via a wireless communication protocol, the network device 606 connected to the other network devices in the media playback system via a wired communication protocol, and the network device 608 connected to the other network devices in the media playback system via a network created by the network device 606. Further, in FIG. 6B, each of the network devices 606, 608, 610, and 612 may be capable of connecting to the media playback device directly via the LAN.

Similar to FIG. 6A, in practice, applying the steps of the method flow diagram 500 described above with respect to FIG. 5 to the network topology 600 shown in FIG. 6B may first include the user device 602, after validating and transmitting the network credentials of the LAN, transmitting a command to the network device 606 to temporarily disconnect from the other network devices (e.g., the user device 602 and the network devices 608, 610, and 612) in the media playback system via the wired communication protocol. As previously discussed, this command might be sent at an initialization time and may include a command for the network device 606 to, at a first time, temporarily disable a network interface that corresponds to the wired communication protocol. The command might also include a command to, after a delay, reenable the network interface that corresponds to the wired communication protocol.

The user device 602 may also transmit a command to each of the network devices 608, 610 and 612 to, at a second time while the network device 606 is temporarily disconnected from the LAN, test its network connectivity with other network devices in the media playback system. In this example, the second time is after the first time associated with the network device 606 temporarily disconnecting from the other network devices in the media playback system but before a third time at which the network device 606 reconnects to the other network devices in the media playback system. In response to receiving the command to test its respective network connectivity, each of the network devices 608, 610, and 612 will attempt to query the user device 602 via the LAN. As previously mentioned, each of the network devices 608, 610, and 612 in the example shown in FIG. 6B may be capable of independently connecting to the LAN and thus each of the network devices 608, 610, and 612 may query the user device 602 without issue.

After the network device 606 reconnects, the user device 602 may then transmit a request to the network devices 608, 610, and 612 for their respective network connectivity test results. In turn, each of the network devices 608, 610, and 612 may transmit its respective network connectivity test results to the user device 602. Upon receiving the network connectivity test results, the user device 602 may determine that each of the network devices 608, 610, and 612 was able to connect to the media playback system. In turn, the user device 602 may communicate this determination to the user via a display on the user device 602. The user 602 may additionally communicate an indication that the user can remove the network device 606 from the media playback system without affecting performance of the rest of the media playback system.

Figure 6C:
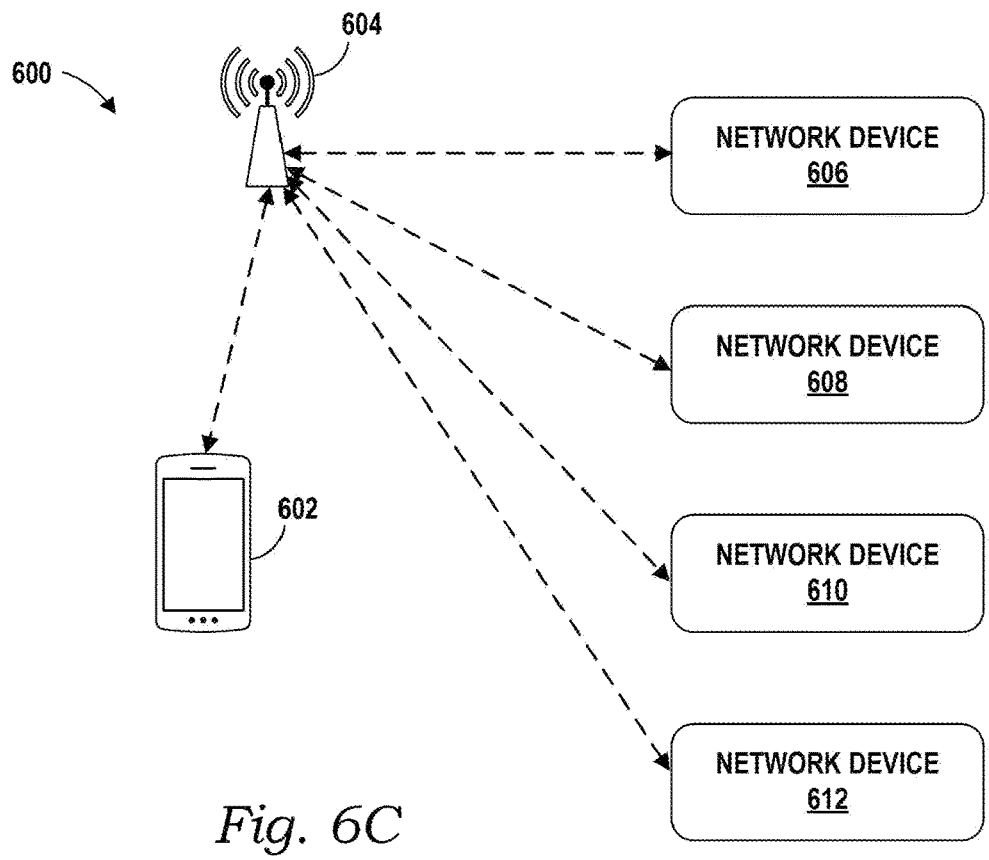
FIG. 6C is an example network topology in accordance with aspects of the disclosure.

FIG. 6C depicts another alternative media playback system network topology 600 that includes the user device 602, router 604, and network devices 606, 608, 610, and 612.

However, the network device 606 may be an older playback device that is to be removed, while the network device 608, 610, and 610 may be newer playback devices. As such, the network topology 600 includes the user device 602 and the network devices 606, 608, 610 and 612 connected to the media playback system via a wireless communication protocol. Further, in FIG. 6C, each of the network devices 606, 608, 610, and 612 may be capable of connecting to the media playback device directly via the LAN.

Similar to FIGS. 6A and 6B, in practice, applying the steps of the method flow diagram 500 described above with respect to FIG. 5 to the network topology 600 shown in FIG. 6C may first include the user device 602, after validating and transmitting the network credentials of the LAN, transmitting a command to the network device 606 to temporarily disconnect from the other network devices (e.g., the user device 602 and the network devices 608, 610, and 612) in the media playback system via the wireless communication protocol. As previously discussed, this command might be sent at an initialization time and may include a command for the network device 606 to, at a first time, temporarily disable a network interface that corresponds to the wireless communication protocol. The command might also include a command to, after a delay, reenable the network interface that corresponds to the wireless communication protocol.

The user device 602 may also transmit a command to each of the network devices 608, 610 and 612 to, at a second time while the network device 606 is temporarily disconnected from the LAN, test its network connectivity with other network devices in the media playback system. In this example, the second time is after the first time associated with the network device 606 temporarily disconnecting from the other network devices in the media playback system but before a third time at which the network device 606 reconnects to the other network devices in the media playback system. In response to receiving the command to test its respective network connectivity, each of the network devices 608, 610, and 612 will attempt to query the user device 602 via the LAN. As previously mentioned, each of the network devices 608, 610, and 612 may be capable of connecting to the LAN and thus each of the network devices 608, 610, and 612 may query the user device 602 without issue.

The user device 602 may then transmit a request to the network devices 608, 610, and 612 for their respective network connectivity test results. In turn, each of the network devices 608, 610, and 612 may transmit its respective network connectivity test results to the user device 602. Upon receiving the network connectivity test results, the user device 602 may determine that each of the network devices 608, 610, and 612 was able to connect to the media playback system. In turn, the user device 602 may communicate this determination to the user via a display on the user device 602. The user 602 may additionally communicate an indication that the user can remove the network device 606 from the media playback system without affecting performance of the rest of the media playback system.

Figure 6D:
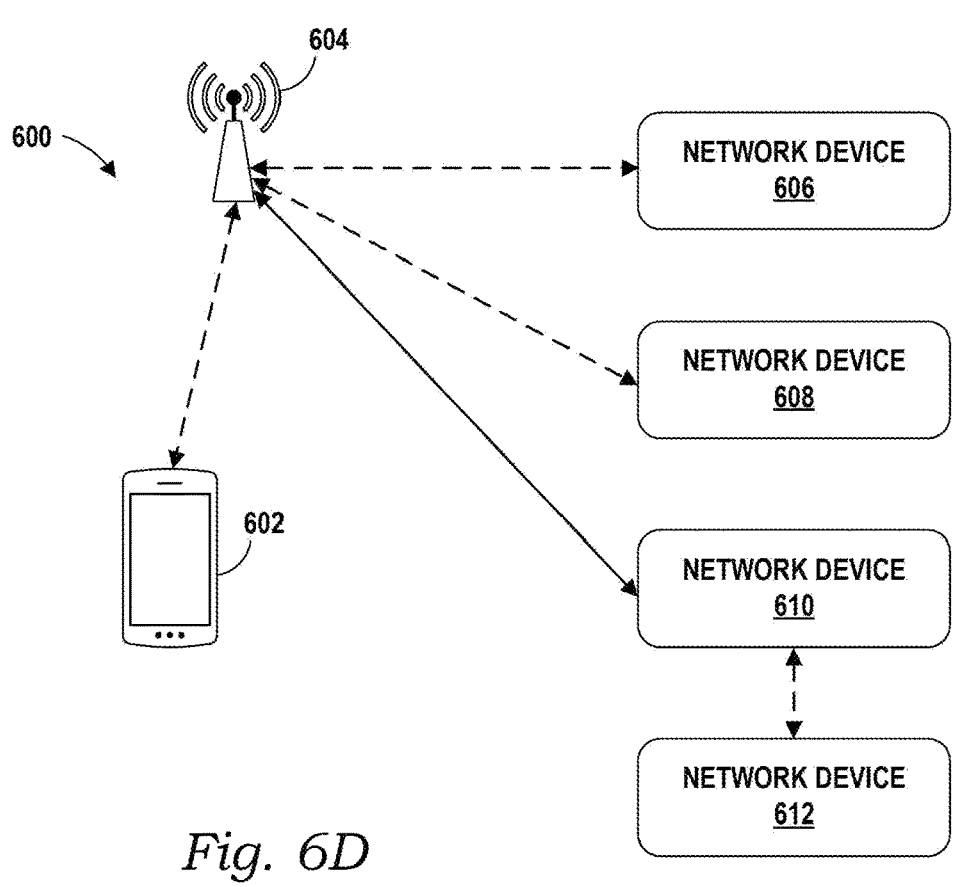
FIG. 6D is an example network topology in accordance with aspects of the disclosure.

FIG. 6D depicts yet another alternative media playback system network topology 600 that includes the user device 602, router 604, and network devices 606, 608, 610, and 612. The network devices 606, 608, and 612 might be newer playback device, while the network device 610 might be an older playback device that is to be removed. The network topology 600 may include the user device 602 and the network devices 606 and 608 connected to the media playback system via a wireless communication protocol, the network device 610 connected to the media playback system via a wired communication protocol, and the network device 612 connected to a wireless mesh network created by the network device 610. Further, in FIG. 6D, each of the network devices 606, 608, and 612 may be capable of connecting to the media playback device directly via the LAN, even though the network device 612 may not be close enough to the router 604 to do so.

In practice, applying the steps of the method flow diagram 500 described above with respect to FIG. 5 to the network topology 600 shown in FIG. 6D may first include the user device 602, after validating and transmitting the network credentials of the LAN, transmitting a command to the network device 610 to temporarily disconnect from the other network devices (e.g., the user device 602 and the network devices 606, 608, and 612) in the media playback system via the wired communication protocol. As previously discussed, this command might be sent at an initialization time and may include a command for the network device 610 to, at a first time, temporarily disable a network interface that corresponds to the wired communication protocol. The command might also include a command to later reenable the network interface that corresponds to the wired communication protocol.

The user device 602 may then transmit a command to each of the network devices 606, 608 and 612 to, at a second time while the network device 610 is temporarily disconnected from the LAN, test its network connectivity with other network devices in the media playback system. In this example, the second time is after the first time associated with the network device 610 temporarily disconnecting from the other network devices in the media playback system but before a third time at which the network device 610 reconnects to the other network devices in the media playback system. In response to receiving the command to test its respective network connectivity, each of the network devices 606, 608, and 612 will attempt to query the user device 602 via the LAN. As previously mentioned, each of the network devices 606, 608, and 612 may be capable of connecting to the LAN, but since the network device 612 is not within range of the router 604, the network device 612 may be unable to query the user device 602, while the network devices 606 and 608 may query the user device 602 without issue.

After the network device 610 reconnects to the other network devices in the media playback system, the user device 602 may then transmit a request to the network devices 606, 608, and 612 for their respective network connectivity test results. In turn, each of the network devices 606, 608, and 612 may transmit its respective network connectivity test results to the user device 602. Upon receiving the network connectivity test results, the user device 602 may determine that the network devices 606 and 608 were able to connect to the media playback system while the network device 610 was temporarily disconnected, while the 612 was unable to connect to the media playback system while the network device 610 was temporarily disconnected. In turn, the user device 602 may then communicate this determination to the user via a display on the user device 602. The user 602 may additionally communicate further troubleshooting steps or additional options to the user.

Further, it should be understood that the examples described above in connection to FIGS. 6A-6D are for illustrative purposes and should not be considered as limiting. Accordingly, the examples provided are not the only ways to implement the message flow diagram 500 described with respect to FIG. 5 as other media playback system configurations and network topologies are contemplated herein. Further, it should be understood that combinations of various elements of each of the examples described in FIGS. 6A-6D are also possible.

IV. Example Methods for Simulating Network Device Removal

Figure 7:
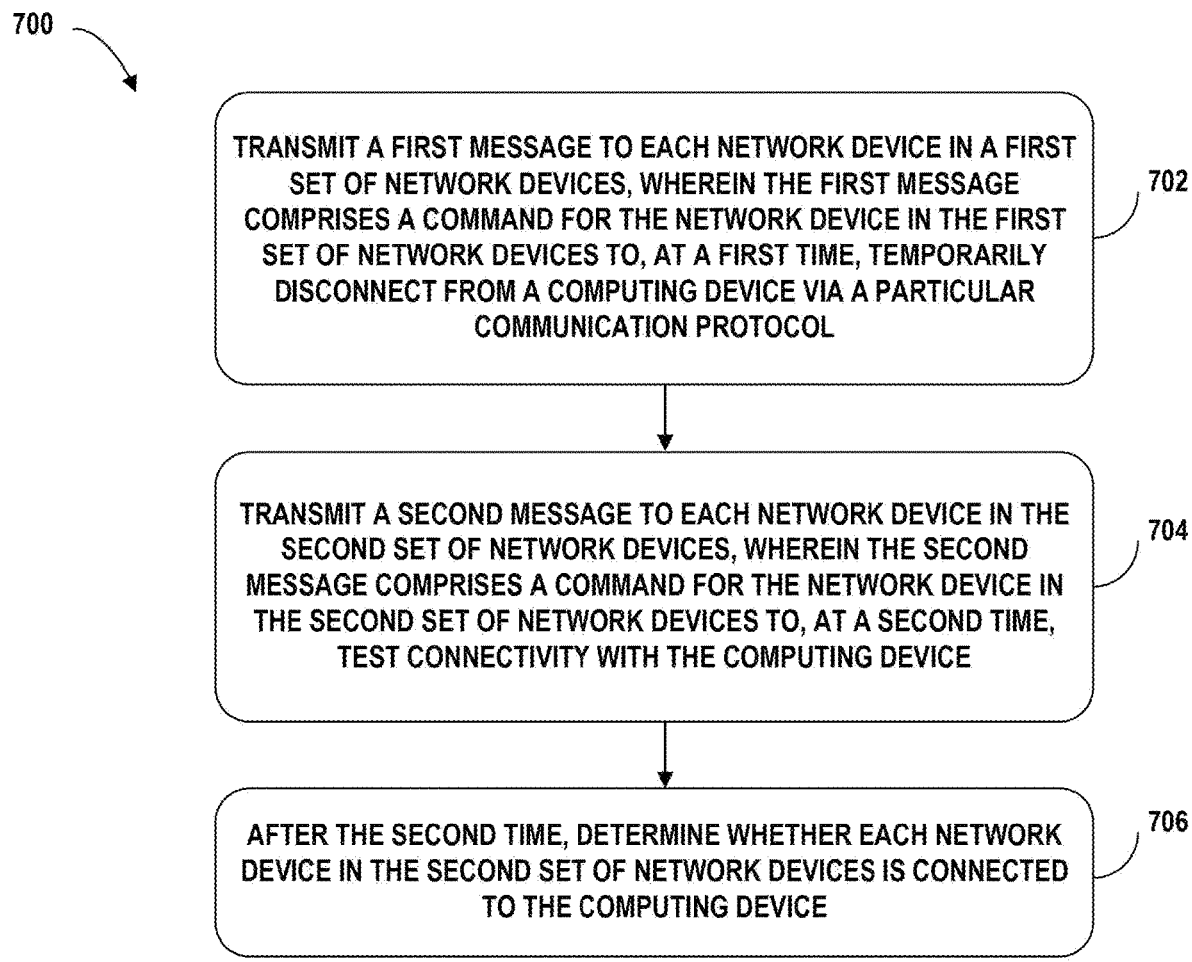
FIG. 7 is a flow diagram of an example method in accordance with aspects of the disclosure.

FIG. 7 shows an example flow diagram of a method 700 that can be implemented by a computing device, such as the controller device 104 described with respect to FIGS. 4A, 4B, and 4C, the user device 502 described with respect to FIG. 5, and the user device 602 described with respect to FIGS. 6A, 6B, 6C, and 6D.

Various embodiments of the method 700 include one or more operations, functions, and actions illustrated by blocks 702, 704, and 706. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 700 and other processes and methods disclosed herein, the flow diagram shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

The method 700 may begin at block 702 with a computing device, while operating as a control device of a networked media playback system that includes a first set of network devices and a second set of network devices, transmitting, via a network interface, a first message to each network device in the first set of network devices. The first message may include a command for the network device in the first set of network devices to, at a first time, temporarily disconnect from the computing device via a particular communication protocol, as discussed above in relation to FIGS. 5 and 6A-6D. For example, the command may be for each network device in the first set of network devices to disconnect following a first delay. In this regard, the first message may be transmitted at an initialization time that is before the first time.

At block 704, the method 700 may involve transmitting, via the network interface, a second message to each network device in the second set of network devices that includes a command for the network device in the second set of network devices to, at a second time, test connectivity with the computing device. For example, the command may be for each network device in the second set of network devices to test its connectivity with the computing device following a second delay. In this regard, the second delay may be greater than the first delay, as shown in FIG. 5 and discussed above.

Returning to block 702, the first message may further include a command for each network device in the first set of network devices to reestablish connection with the computing device via the particular communication protocol at a third time that follows the second time. In this regard, the command may be a command to reestablish connection with the computing device via the particular communication protocol following a third delay, which may be greater than the second delay, as shown in FIG. 5. Accordingly, to increase the likelihood of accurate connectivity test results at block 704, the second message that the computing device transmits to the second set of network devices may also include a command for the network device in the second set of network devices to, before the third time, cease testing connectivity with the computing device.

At block 706, the method 700 may involve the computing device, after the second time, determining whether each network device in the second set of network devices is connected to the computing device. In some examples, determining whether each network device in the second set of network devices is connected to the computing device may involve determining that one or more network devices in the of the second set of network devices failed to connect to the computing device while the first set of network devices were temporarily disconnected from the computing device, as described above with respect to the examples shown in FIGS. 6A and 6D. After determining whether each network device in the second set of network devices was connected to the computing device during the connectivity test, the computing device may display an indication of whether each network device in the second set of network devices was connected to the computing device.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing device comprising:
   at least one processor;
   a user interface;
   at least one non-transitory computer-readable medium; and
   program instructions stored on the at least one non-transitory computer-readable medium that are executable by the at least one processor such that the computing device is configured to:
      operate as a control device of a plurality of networked media playback systems comprising at least a first networked media playback system;
      transmit, to a first network device of the first networked media playback system that is configured to communicate with the computing device via a particular communication protocol, a first command to, at a first time, simulate removal of the first network device from the first networked media playback system by temporarily disconnecting from the computing device via the particular communication protocol;
      transmit, to a second network device of the first networked media playback system, a second command to, at a second time while the first network device is simulating removal of the first network device from the first networked media playback system by temporarily disconnecting from the computing device, test connectivity of the second network device with the computing device;
      after the second time, obtain network connectivity test results for the second network device of the first networked media playback system while the first network device was simulating removal of the first network device from the networked media playback system by temporarily disconnecting from the computing device; and
      display, via the user interface, information about network connectivity test results for the second network device of the first networked media playback system.

2. The computing device of claim 1, wherein the control device is a remote control device that is configured to communicate with network devices of the first networked media playback system via a wide area network (WAN).

3. The computing device of claim 1, wherein the first command further comprises a command for the first network device to, at a third time after the second time, reestablish connection with the computing device via the particular communication protocol.

4. The computing device of claim 3, wherein the program instructions that are executable by the at least one processor such that the computing device is configured to transmit the first command comprise program instructions that are executable by the at least one processor such that the computing device is configured to transmit the first command at an initialization time before the first time.

5. The computing device of claim 1, wherein the network connectivity test results for the second network device indicate that the second network device failed to establish a connection with the computing device while the first network device was disconnected from the computing device, and wherein the information about the network connectivity test results for the second network device comprises an indication of a connectivity failure of the second network device.

6. The computing device of claim 1, wherein the information about the network connectivity test results for the second network device further comprises information for troubleshooting connectivity of the second network device.

7. The computing device of claim 1, further comprising program instructions stored on the at least one non-transitory computer-readable medium that are executable by the at least one processor such that the computing device is configured to:
before transmitting the first command, receive, via the user interface, a request to test connectivity of one or more network devices of the first networked media playback system.

8. The computing device of claim 1, further comprising program instructions stored on the at least one non-transitory computer-readable medium that are executable by the at least one processor such that the computing device is configured to:
receive, via the user interface, a request to test connectivity of one or more network devices of a second networked media playback system of the plurality of networked media playback systems;
transmit, to a third network device of the second networked media playback system that is configured to communicate with the computing device via the particular communication protocol, a first third command to, at a third time, simulate removal of the third network device from the second networked media playback system by temporarily disconnecting from the computing device via the particular communication protocol;
transmit, to a fourth network device of the second networked media playback system, a fourth command to, at a fourth time while the third network device of the second networked media playback system is disconnected from the computing device, test respective connectivity of the fourth network device with the computing device;
after the fourth time, obtain network connectivity test results for the fourth network device of the second networked media playback system while the third network device of the second networked media playback system was disconnected from the computing device; and
display, via the user interface, information about network connectivity test results for the fourth network device of the second networked media playback system.

9. At least one non-transitory computer-readable medium, wherein the at least one non-transitory computer-readable medium is provisioned with program instructions that, when executed by at least one processor, cause a computing device to:
operate as a control device of a plurality of networked media playback systems comprising at least a first networked media playback system;
transmit, to a first network device of the first networked media playback system that is configured to communicate with the computing device via a particular communication protocol, a first command to, at a first time, simulate removal of the first network device from the first networked media playback system by temporarily disconnecting from the computing device via the particular communication protocol;
transmit, to a second network device of the first networked media playback system, a second command to, at a second time while the first network device is simulating removal of the first network device from the networked media playback system by temporarily disconnecting from the computing device, test connectivity of the second network device with the computing device;
after the second time, obtain network connectivity test results for the second network device of the first networked media playback system while the first network device was simulating removal of the first network device from the networked media playback system by temporarily disconnecting from the computing device; and
display, via a user interface of the computing device, information about network connectivity test results for the second network device of the first networked media playback system.

10. The at least one non-transitory computer-readable medium of claim 9, wherein the control device is a remote control device that is configured to communicate with network devices of the first networked media playback system via a wide area network (WAN).

11. The at least one non-transitory computer-readable medium of claim 9, wherein the first command further comprises a command for the first network device to, at a third time after the second time, reestablish connection with the computing device via the particular communication protocol.

12. The at least one non-transitory computer-readable medium of claim 11, wherein the program instructions that, when executed by at least one processor, cause the computing device to transmit the first command comprise program instructions that, when executed by at least one processor, cause the computing device to transmit the first command at an initialization time before the first time.

13. The at least one non-transitory computer-readable medium of claim 9, wherein the network connectivity test results for the second network device indicate that the second network device failed to establish a connection with the computing device while the first network device was disconnected from the computing device, and wherein the information about the network connectivity test results for the second network device comprises an indication of a connectivity failure of the second network device.

14. The at least one non-transitory computer-readable medium of claim 9, wherein the information about the network connectivity test results for the second network device further comprises information for troubleshooting the connectivity of the second network device.

15. The at least one non-transitory computer-readable medium of claim 9, wherein the at least one non-transitory computer-readable medium is also provisioned with program instructions that, when executed by at least one processor, cause the computing device to:
before transmitting the first command, receive, via the user interface of the computing device, a request to test connectivity of one or more network devices of the first networked media playback system.

16. The at least one non-transitory computer-readable medium of claim 9, wherein the at least one non-transitory computer-readable medium is also provisioned with program instructions that, when executed by at least one processor, cause the computing device to:
receive, via the user interface, a request to test connectivity of one or more network devices of a second networked media playback system of the plurality of networked media playback systems;

transmit, to a third network device of the second networked media playback system that is configured to communicate with the computing device via the particular communication protocol, a first third command to, at a third time, simulate removal of the third network device from the second networked media playback system by temporarily disconnecting from the computing device ever via the particular communication protocol;

transmit, to a fourth network device of the second networked media playback system, a fourth command to, at a fourth time while the third network device of the second networked media playback system is disconnected from the computing device, test respective connectivity of the fourth network device with the computing device;

after the fourth time, obtain network connectivity test results for the fourth network device of the second networked media playback system while the third network device of the second networked media playback system was disconnected from the computing device; and display, via the user interface, information about network connectivity test results for the fourth network device of the second networked media playback system.

17. A method carried out by a computing device, the method comprising:

operating as a control device of a plurality of networked media playback systems comprising at least a first networked media playback system;

transmitting, to a first network device of the first networked media playback system that is configured to communicate with the computing device via a particular communication protocol, a first command to, at a first time, simulate removal of the first network device from the first networked media playback system by temporarily disconnecting from the computing device via the particular communication protocol;

transmitting, to a second network device of the first networked media playback system, a second command to, at a second time while the first network device is simulating removal of the first network device from the networked media playback system by temporarily disconnecting from the computing device, test connectivity of the second network device with the computing device;

after the second time, obtaining network connectivity test results for the second network device of the first networked media playback system while the first network device was simulating removal of the first network device from the networked media playback system by temporarily disconnecting from the computing device; and displaying, via a user interface of the computing device, information about network connectivity test results for the second network device of the first networked media playback system.

18. The method of claim 17, wherein the control device is a remote control device that is configured to communicate with network devices of the first networked media playback system via a wide area network (WAN).

19. The method of claim 17, wherein the first command further comprises a command for the first network device to, at a third time after the second time, reestablish connection with the computing device via the particular communication protocol.

20. The method of claim 17, wherein the network connectivity test results for the second network device indicate that the second network device failed to establish a connection with the computing device while the first network device was disconnected from the computing device, and wherein the information about the network connectivity test results for the second network device comprises an indication of a connectivity failure of the second network device.

* * * * *